United States Patent
Schmidt (10) Patent No.: US 9,667,356 B2
(45) Date of Patent: May 30, 2017

(54) SIGNAL GENERATING DEVICE WITH INTEGRATED FADING GENERATING UNIT AND SIGNAL GENERATING METHOD

(71) Applicant: Rohde & Schwarz GmbH & Co. KG, Munich (DE)

(72) Inventor: Stefan Schmidt, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/783,023

(22) PCT Filed: Jun. 4, 2013

(86) PCT No.: PCT/EP2013/061484
§ 371 (c)(1),
(2) Date: Oct. 7, 2015

(87) PCT Pub. No.: WO2014/166552
PCT Pub. Date: Oct. 16, 2014

(65) Prior Publication Data
US 2016/0072595 A1    Mar. 10, 2016

(30) Foreign Application Priority Data
Apr. 12, 2013  (WO) .............. PCT/EP2013/057706

(51) Int. Cl.
*H04B 17/00* (2015.01)
*H04B 17/391* (2015.01)

(52) U.S. Cl.
CPC ..... *H04B 17/0085* (2013.01); *H04B 17/3911* (2015.01); *H04B 17/3912* (2015.01)

(58) Field of Classification Search
CPC .............. H04B 17/0085; H04B 17/3911
USPC .......................................... 375/224
See application file for complete search history.

(56) References Cited

U.S. PATENT DOCUMENTS

| | | | | |
|---|---|---|---|---|
| 6,061,394 A * | 5/2000 | Itahara | ............... | H04B 17/3911 375/227 |
| 2007/0127559 A1 * | 6/2007 | Chang | ............... | H04B 17/0087 375/213 |
| 2009/0094492 A1 | 4/2009 | Music et al. | | |

FOREIGN PATENT DOCUMENTS

| | | |
|---|---|---|
| DE | 102008055759 A1 | 5/2010 |
| EP | 2523494 A1 | 11/2012 |
| GB | 2440165 A | 1/2008 |

* cited by examiner

*Primary Examiner* — Michael Neff
(74) *Attorney, Agent, or Firm* — Ditthavong & Steiner, P.C.

(57) ABSTRACT

The invention relates to a signal generating device for generating a signal including simulated channel fading characteristics. The signal generating device includes a fading simulating unit, a signal generating unit and a modulating unit. The signal generating unit generates a first number of symbols according to a number of transmitting means for a simulated transmission to a device under test. The fading simulating unit calculates from the first number of symbols a second number of faded symbols, wherein a number of signals to be output corresponds to a number of receiving means of the device under test, based on a set of filter parameters, and provides the calculated second number of faded symbols to the modulating means; and the modulating unit generates modulated signals to be output from the second number of faded symbols.

13 Claims, 7 Drawing Sheets

| tap | $\tau_{TAP}$ [ns] | $\sigma_{TAP}$ [dB] |
|---|---|---|
| 1 | 0 | 0 |
| 2 | 30 | -1,5 |
| 3 | 150 | -1,4 |
| 4 | 310 | -3,6 |
| 5 | 370 | -0,6 |
| 6 | 710 | -9,1 |
| 7 | 1090 | -7 |
| 8 | 1730 | -12 |
| 9 | 2510 | -16,9 |

SIGNAL GENERATING DEVICE WITH INTEGRATED FADING GENERATING UNIT AND SIGNAL GENERATING METHOD

CROSS-REFERENCE TO RELATED APPLICATION

The present application is a national phase application of PCT Application No. PCT/EP2013/061484, filed Jun. 4, 2013, which claims priority to PCT/EP2013/057706, filed Apr. 12, 2013, the entire contents of which are herein incorporated by reference.

TECHNICAL FIELD

The invention, according to the various embodiments described herein, relates to a signal generating device for generating a signal including simulated channel fading characteristics. In particular the invention refers to a device and a method for generating a signal for testing of devices of a wireless transmission system that may be characterised by multiple carriers and multiple input and output antennas, the testing taking fading characteristics of a wireless channel into account.

BACKGROUND

In order to meet an ever increasing demand for data services in cellular mobile applications, wireless communication standards characterised by high spectral efficiency and making use of a spatial dimension in transmitting information between base stations and mobile terminals are defined and the requirement for testing the performance characteristics of devices operable under such standards increases.

Orthogonal frequency division multiplexing (OFDM) is one of the spectrally efficient transmission schemes, being employed for example in wireless communication under the standards long term evolution (LTE) for a fourth generation cellular wireless system or some of the IEEE 802.11 series for wireless local area networks (WLAN).

Encoded bit streams to be transmitted are divided into plural data streams with reduced bit rate, the bit information is mapped onto constellation symbols for transmission. Then each partial data stream is modulated onto a carrier signal, wherein the carrier frequencies are orthogonal to each other, the modulated carrier signals comprising the constellation symbols of said partial data streams are added to form a transmission signal and converted to a transmission frequency.

An improvement in transmission efficiency is further achieved by employing multiple antennas both at base stations and wireless devices, thereby defining multiple input multiple output systems (MIMO). An encoded bit stream for transmission may be distributed onto different antennas of the transmitting device as sources and transmitted on the same frequency to a receiving device as destination. Hence multiple different transmission paths, either direct paths or indirect paths including reflected transmission signals reduce losses being inflicted due to superposition of signals received via multiple signal path propagation. Hence increased data rates at an advantageous receive signal quality are achieved by employing MIMO techniques.

Testing of devices for multicarrier systems and even more when also testing of MIMO capabilities is concerned, requires dedicated test equipment for reproducible tests under realistic test conditions. The external influences on signal transmission in a real world communication system between a base station as an example for a signal source and the device under test (DUT) are simulated by a signal generator and a channel simulator. In known test systems the channel simulator modifies the test signal generated by a signal generator in the time domain according to given channel characteristics and provides the modified signal to the DUT. The computational requirements for executing the required calculations in the channel simulator are large particularly when taking multicarrier systems into account.

DE 10 2008 055 759 A1 proposes to integrate a channel simulator unit into a test device for testing a mobile communication terminal. The channel simulation is implemented by distorting one or more of the modulated carrier signals by employing a static and frequency selective channel model in the frequency domain. Time variant effects on the transmission signal are excluded by the test device of DE 10 2008 055 759 A1 and in particular examination of fading effects on test signals are therefore not sufficiently addressed in the cited reference.

SUMMARY

Accordingly, a signal generator for generating faded test signals to a device under test with reduced complexity and reduced computational effort requiring advantageously reduced implementation effort, are provided herein.

A signal generating device according to the invention includes an integrated fading simulation unit. The signal generator includes a signal generating unit configured to generate a first number of symbols according to a number of transmitting means for a simulated transmission to a device under test for example antennas of a base station. In the signal generating unit the encoded bits are mapped to constellation symbols to generate the first number of symbols. The fading simulation unit is configured to calculate from the first number of symbols a second number of faded symbols based on a set of filter parameters, wherein the second number corresponds to a number of test output ports, each test output port being connectable to a receiving means of the DUT. The receiving means of the DUT are for example receiving antennas of the DUT. The set of filter parameters may be elements of a matrix comprising filter parameters. The fading simulation unit then provides the calculated second number of faded symbols to the modulating means of the signal generating device. The modulating means is configured to generate modulated signals from the faded symbols provided by the channel simulating means.

The inventive signal generating device solves the technical problem by integrating the channel simulating means into the signal generator, by simulating the wireless channel by modifying the first number of symbols, the first number of symbols corresponding to the number of simulated transmitting means or transmit antennas and to subsequently modulate the second number of faded symbols in a modulating means after channel simulation. Accordingly a reduction in computational requirements is achieved, as the modulation means is required to modulate the number of symbols only for a number of receive means or antennas, as typically the number of receive antennas, e.g. of a mobile phone, may be smaller than the number of transmit antennas, e.g. of a base station, in MIMO systems. The requirements, e.g. with respect to data rates on an internal data bus in the channel simulator and the signal generator device, are also reduced when compared to an external channel simulator. The inventive signal generation with integrated fading simulation nevertheless provides a time variant consideration of multipath propagation effects in a multicarrier communication system although providing advantages in complexity and costs over the state of the art.

Preferably the signal generating device takes into account, that a transmission channel is defined between each of the transmitting means of a signal source and each of the receiving means of a real system to be simulated. The number of transmission channels taken into consideration for channel simulation is then given by the product of the first number of transmitting means and the second number of receiving means. The transmitting means or the receiving means may be simulated transmit antennas or receive antennas of the DUT according to an applicable communication standard.

Preferably the fading simulator unit includes a transform parameter generating means configured to generate a set of channel response parameters from a set of channel impulse responses each characterising a particular transmission channel and a calculation means configured to calculate the second number of faded symbols from the first number of symbols using the set of channel response parameters. The channel response parameters are in one embodiment dynamic channel response parameters taking account of time variant properties of the simulated transmission channel.

Advantageously the transform parameter generating means of the fading simulator unit includes plural sample generating means configured to generate filtered complex samples by filtering independent and identically distributed complex samples. The independent and identically distributed complex samples are generated by plural (pseudo-) random number generators. A distribution means of the fading simulator unit is advantageously configured to rearrange the filtered complex samples to generate a sample sequence for each transmission channel. Each sample in the sample sequences is multiplied with a value. A multiplying means is configured to multiply then the one or more transmission channel sample sequences with a correlation matrix to generate the set of channel impulse responses. A transforming means of the fading simulator unit is configured to calculate the set of channel response parameters by transforming the set of channel impulse responses into the frequency domain.

According to an embodiment of the signal generating device, the transforming means is configured to transform the set of channel impulse responses into the frequency domain based on a predetermined frequency spacing.

The transform parameter generating means according to an embodiment includes a transform means configured to transform the set of channel impulse responses into the frequency domain for a subset of the used subcarrier frequencies as the predetermined frequencies only. The subset of subcarrier frequencies accordingly includes a reduced number of the plurality of subcarrier frequencies; and the channel response parameters for the subcarrier frequencies of the plurality of subcarrier frequencies not included in the subset may be determined by interpolation. Hence the set of channel response parameters may be even more efficiently determined for sake of a further reduction in computational effort.

Preferably the signal generating device is characterised by the correlation matrix including parameters describing the characteristics of each single transmission channel and/or interactions or correlations between the transmission channels.

The transform parameter generating means advantageously includes filter means configured to filter the complex samples in order to define an autocorrelation function and further also Doppler characteristics of the filtered complex samples.

In an embodiment a distribution means is provided and configured to generate sample data streams for each transmission channel by arranging a third number of filtered complex samples in a number of filtered complex data sequences corresponding to the first number times the second number.

The method may be implemented in a computer program with program-code means for executing the method steps. The method may be implemented in form of a computer program-product with program-code means stored on a machine-readable medium for executing the necessary steps.

The inventive method can also be implemented on a signal processor or even in hardware, for example in a field programmable gate array (FPGA).

The inventive method can also be implemented in a combination of hardware and software components.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

An exemplary embodiment of the invention is now further explained with respect to the drawings as a non-limiting example, wherein.

DETAILED DESCRIPTION

Figure 1:
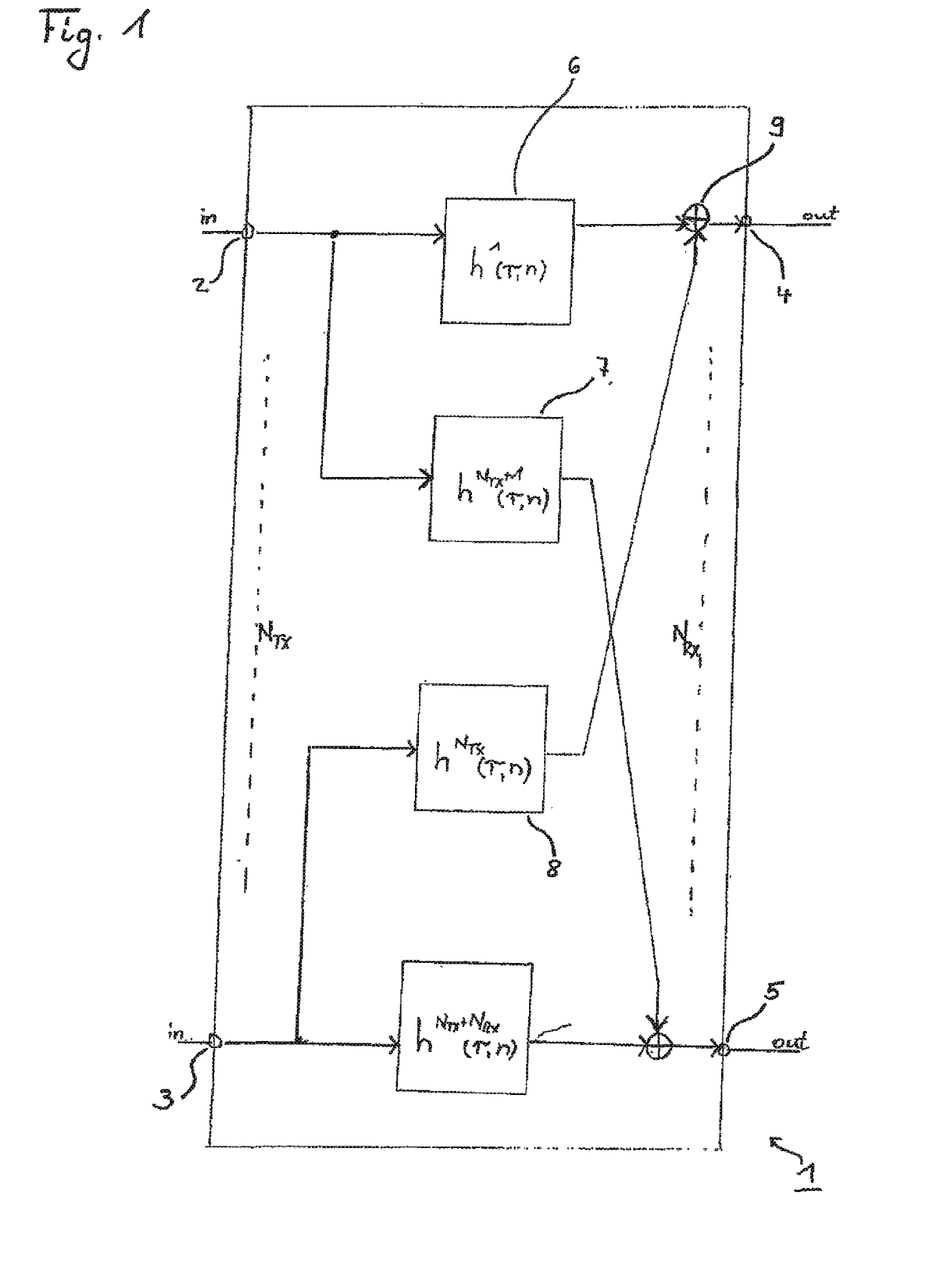
FIG. 1 shows a state of the art fader in the time domain.
Figure 2:
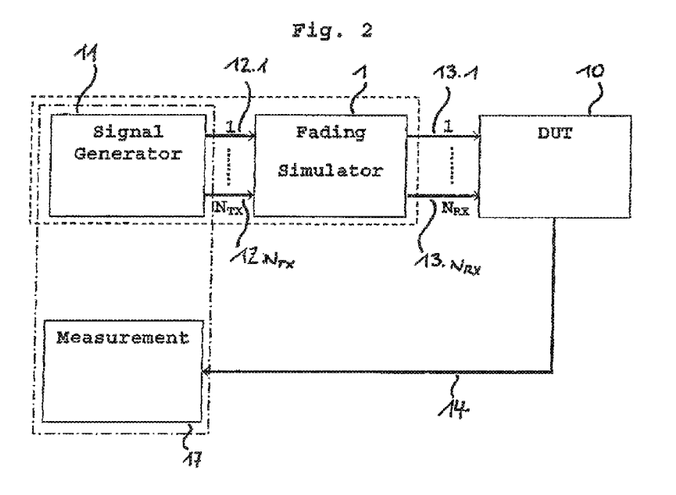
FIG. 2 shows a measurement setup using a signal generator and a fader according to prior art.

First, along FIGS. 1 and 2 the underlying technical problem and the general principle of the present invention are presented.

Conventional fading simulators are generally implemented as time variant filters for filtering input signals in the time domain. The time variant filters may include a finite number of discrete filter taps $N_{TAP}$. Each filter is characterised by its time variant impulse response $h(\tau, t)$ $$h(\tau, t) = \sum_{k=1}^{N_{TAP}} \sigma_k(t) x_k(t) \delta(\tau - \tau_k(t)) \quad (1)$$

wherein $N_{TAP}$ denotes the number of discrete filter taps, $x_k(t)$ is a random process with unit variance, $\sigma_k(t)$ is the standard deviation and $\tau_k(t)$ is the delay time of the tap with the number k, while $\delta(t)$ refers to the discrete delta function and t denotes the time. The discrete delta function is defined according to $$\delta(t) = \begin{cases} 1 & \text{fur } t = 0 \\ 0 & \text{fur } t \neq 0 \end{cases} \quad (2)$$

wherein t denotes the time in equations (1) and (2). In most practical applications, the standard deviation $\sigma_k(t)$ as well as and the time delay $\tau_k(t)$ can be regarded as being independent from the time t, so that equation (1) may be simplified to as $$h(\tau, t) \sum_{k=1}^{N_{TAP}} \sigma_k x_k(t) \delta(\tau - \tau_k) \quad (3)$$

Generally the random process $x_k(t)$ is chosen as Gaussian random process with a classical Doppler power spectral density (hereinafter abbreviated to PSD). If the fading process is further described in the digital base band, equation (1) may be also written in the form $$h(\tau, n) \sum_{k=1}^{N_{TAP}} \sigma_k(n) x_k(n) \delta(\tau - \tau_k(n)) \quad (4)$$

In equation (4) $x_k(n)$ denotes a complex random process with unit variance, wherein imaginary part and real part of $x_k(n)$ each are independent random processes. The parameter n is a discrete time index. If the standard deviation $\sigma_k(n)$ and the delay $\tau_k(n)$ do not vary in time, the filter model according to equation (4) can be rewritten as $$h(\tau, n) \sum_{k=1}^{N_{TAP}} \sigma_k x_k(n) \delta(\tau - \tau_k) \quad (5)$$

In case a MIMO transmission system 1 according to FIG. 1 with a first number of $N_{TX}$ transmit antennas 2, 3 and a second number of $N_{RX}$ receive antennas 4, 5 is addressed, between each transmit antenna and each receive antenna one transmission channel 6, 7, 8 with transmission channel index c is formed. Each transmission channel 6, 7, 8 can be modeled each as a filter $h^c(\tau, n)$ with $$1 \leq c \leq N_{TX} \times N_{RX} \quad (6)$$

Looking at FIG. 1 it can be seen that for obtaining an output signal at a receive antenna 4, the output signals of $N_{TX}$ transmit antennas have to be convolved with the corresponding filter impulse responses $h^c(\tau,n)$ of the transmission channels ending at an antenna 4 and the results of all filter outputs have to be added in an adder 9. FIG. 1 shows this addition explicitly for a 2×2 MIMO transmission system comprising two transmit antennas and two receive antennas, e.g. $N_{TX}=2$ and $N_{RX}=2$. The dots in FIG. 1 show that of course systems with more (or less) transmit and/or receive antennas are possible. The number of transmission channels to be taken into account increases significantly with the number of transmit antenna and receive antenna to be regarded. For $N_{TX}=1$ and $N_{RX}=1$ a single input single output (SISO-) transmission system is given.

FIG. 2 shows a test setup for testing a DUT 10 in a $N_{TX} \times N_{RX}$—MIMO transmission system in the time domain according to prior art. A test signal is generated in the signal generator 11 and provided in $N_{TX}$ parallel transmit signals 12.1, . . . 12.$N_{TX}$ destined for $N_{TX}$ transmitting antennas. The $N_{TX}$ parallel antenna signals 12, . . . 12.$N_{TX}$ are supplied to the fading simulator 1, and in the fading simulator 1 simulated faded $N_{RX}$ receive antenna signals 13.1, . . . 13.$N_{RX}$ are calculated and provided to the DUT 10. The connection 14 shows a reaction of the DUT to the faded test signals, e.g. a transmission quality indicator determined by the DUT 10 and intended for evaluation of the simulated wireless channel based on the received faded test signals at the DUT 10. A measurement unit 17 can be provided for receiving the reaction of the DUT 10 on the received faded test signal 13.1, . . . 13.$N_{RX}$ over connection 14. In FIG. 2, the signal generating device 11 and/or the fading simulator 1 and/or the measurement unit 17 can be formed by one integrated test device as indicated by the dotted and dot-dash lines.

The fading simulator 1 can operate in the baseband, in an intermediate frequency band or in the radiated frequency band of a communications system. The fading simulator 1 operates in the time domain.

Figure 3:
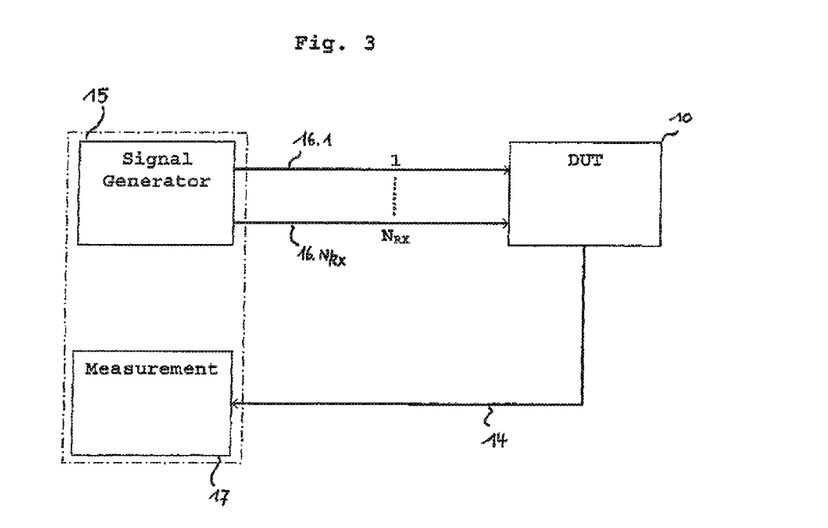
FIG. 3 shows a signal generating device with an integrated fading simulator according to an embodiment of the invention as a block diagram in a measurement setup.

FIG. 3 provides an overview of the test measurement setup according to an embodiment of the invention in a $N_{TX} \times N_{RX}$ MIMO transmission system in the time domain. A signal generating device 15 according to the invention generates a faded test signal comprising signals 16.1, . . . 16.$N_{RX}$ for each of $N_{RX}$ receive antennas of the DUT 10. A measurement unit 17 may be provided for receiving a reaction of the DUT 10 on the received faded test signal 16.1, . . . 16.$N_{RX}$. In FIG. 3, the signal generating device 15 and the measurement unit 17 can be formed by one integrated test device as indicated by the dotted lines.

In FIGS. 2 and 3, the test signals are preferably provided from a number of $N_{RX}$ test outputs to respective $N_{RX}$ Ports of the DUT via test cables. The connection 14 is not necessary and not characterizing for the inventive generating of a signal including fading characteristics in the signal generating device 15.

Figure 4:
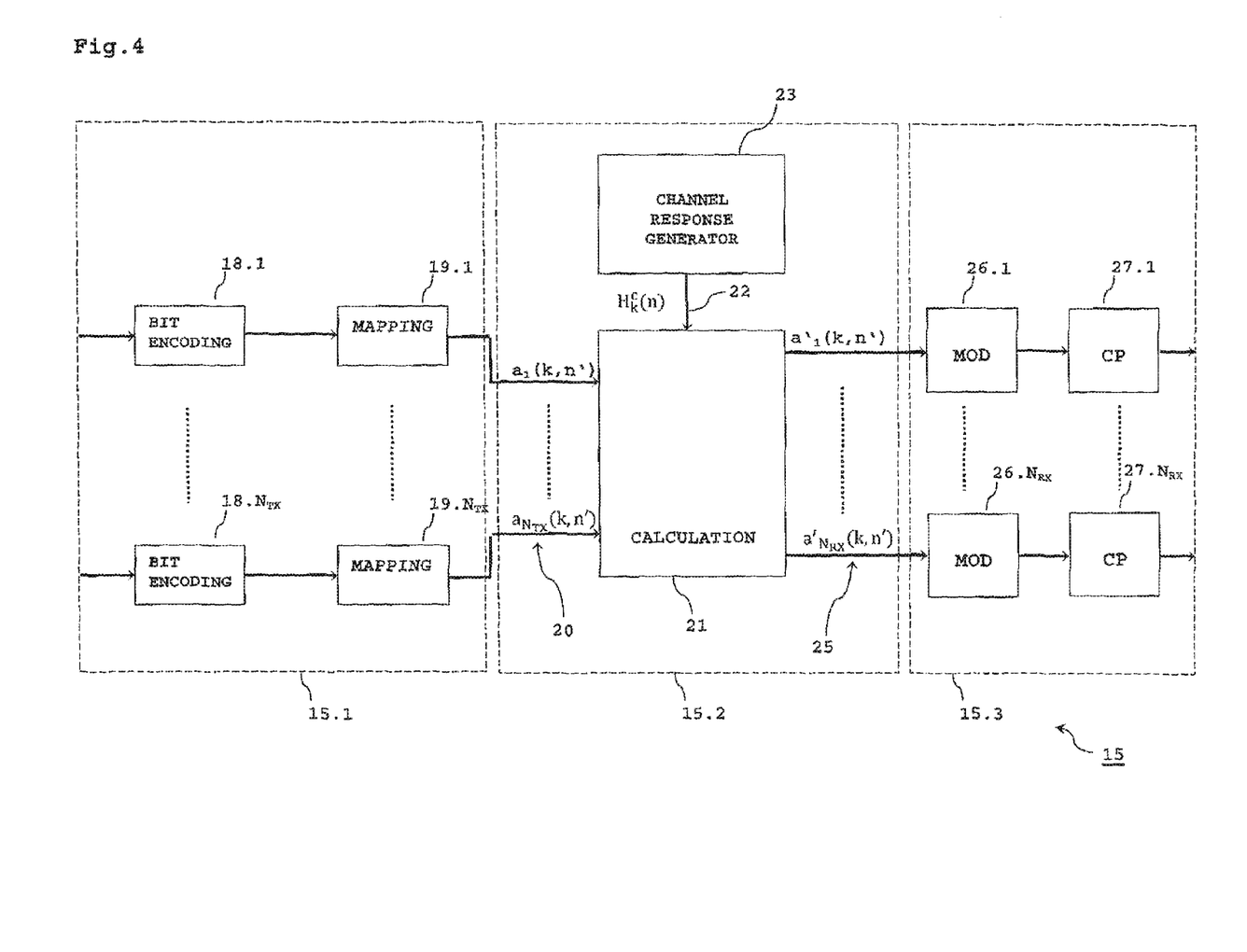
FIG. 4 depicts a signal generating device according to the embodiment of the invention as a block diagram.

FIG. 4 shows the signal generating device 15 according to the embodiment of the invention as a block diagram. Comparing the signal generator 15 according to the invention with prior art, the fading simulation is implemented in the frequency domain. The fading simulation can accordingly be implemented by a matrix multiplication in the signal generating device 15 and is according to the invention performed before modulating the signal for generating the test signal to be transmitted to the DUT 10. Hence no external fading simulator or additional fading simulation module is required in the signal generating device 15 when compared to the signal generator 11 in FIG. 2.

The signal generating device 15 includes a signal generating unit 15.1, a fading simulating unit 15.2 and a modulating unit 15.3. Further subassemblies of the signal generating device not shown in FIG. 4 are discussed below in the description of the embodiment.

The channel response generator 23 in FIG. 4 corresponds to the transform parameter generating means in the attached set of claims. The fading simulating unit 15.2 in FIG. 4 further includes a calculation means 21. The term "symbols" in the attached claims corresponds to the constellation symbols in the I/Q-plane used when discussing FIG. 4.

In FIG. 4 a $N_{TX} \times N_{RX}$ MIMO transmission system is used as an example for the signal generating device 15.

In the signal generating unit 15.1, streams of bit data out of $N_{TX}$ parallel streams of bit data to be transmitted to the DUT 10 are each encoded in a bit encoding unit 18.1, . . . 18.$N_{TX}$. The data streams of encoded bit data are then provided to a constellation mapping unit 19.1, . . . 19.$N_{TX}$ to be mapped to constellation symbols $a_1(k,n')$ . . . $a_{N_{TX}}(k,n')$. The instant of time n' or time index n' refers to a time $\Delta T_{symb}$ which corresponds to a symbol length. The parameter k denotes a subcarrier index. All parallel data streams 1, . . . $N_{TX}$ are processed in a corresponding manner. Hence, a first number of sequences of $N_{TX}$ constellation symbols $a_1(k,n')$ . . . $a_{N_{TX}}(k,n')$ are provided to a calculation means 21.

The signal generating unit 15.1 is described before for an embodiment of the invention comprising $N_{TX}$ streams of bit data 18.1, . . . 18.$N_{TX}$ and the $N_{TX}$ streams of bit data being processed in parallel. The invention is not limited to the embodiment described in FIG. 4. It is also possible without deviating from the invention, to use a number of streams of bit data 18.1, . . . 18.$N_{TX}$ smaller than $N_{TX}$ and to convert them to a number of $N_{TX}$ sequences of constellation symbols 20 $a_1(k,n')$ . . . $a_{N_{TX}}(k,n')$. This conversion from less than $N_{TX}$ parallel streams of bit data 18.1, . . . 18. (N<$N_{TX}$) to a number of $N_{TX}$ $a_1(k,n')$ . . . $a_{N_{TX}}(k,n')$ can be implemented by multiplying with a beamforming matrix, for example.

The fading simulating unit 15.2 includes the calculation means 21 besides a channel response generating means 23.

In the calculation means 21 the constellation symbols 20 $a_1(k,n')$ . . . $a_{N_{TX}}(k,n')$ at each instant time of a vector $\underline{a}(k,n')$ are multiplied with a dynamic filter matrix (DFM-matrix or DFM) and at the output of the calculation means 21 a second number of $N_{Rx}$ faded constellation symbols 25 $a'_1(k,n')$ . . . $a'_{N_{RX}}(k,n')$ is given for each instant of time. The calculation means 21 establishes the DFM Matrix from a set of channel impulse responses.

At the output of the calculation means 21, the second number of faded constellation symbols $a'_1(k,n')$, . . . $a'_{N_{RX}}(k,n')$ 25 after multiplying the first number of symbols with the DFM corresponds to the number of receive antennas $N_{RX}$ of the DUT 10. The faded constellation symbols 25 are then supplied to the modulation units 26.1 . . . 26.$N_{RX}$ forming part of the modulating unit 15.3. The faded constellation symbols 25 are modulated in the $N_{RX}$ parallel modulating units 26.1 . . . 26.$N_{RX}$. After modulation optionally a cyclic prefix (CP) may be inserted into each of the modulated signal parts in optional CP inserting units 27.1, . . . 27.$N_{RX}$ of the modulating unit 15.3. After modulation and cyclic prefix insertion the test signal comprising test signal parts 16.1, . . . 16.$N_{RX}$ are generated in subsequent subassemblies of the signal generating device 15 not shown in FIG. 4. The modulated an faded test signals are then supplied via $N_{RX}$ test ports to the DUT 10. The embodiment in FIG. 4 is a mere example of a part of the claimed signal generating device 15 with $N_{TX}$ and $N_{RX}$ parallel signal branches. Another architecture maintaining the gist of the inventive signal generating device with integrated fading simulation is also viable.

Figure 5:
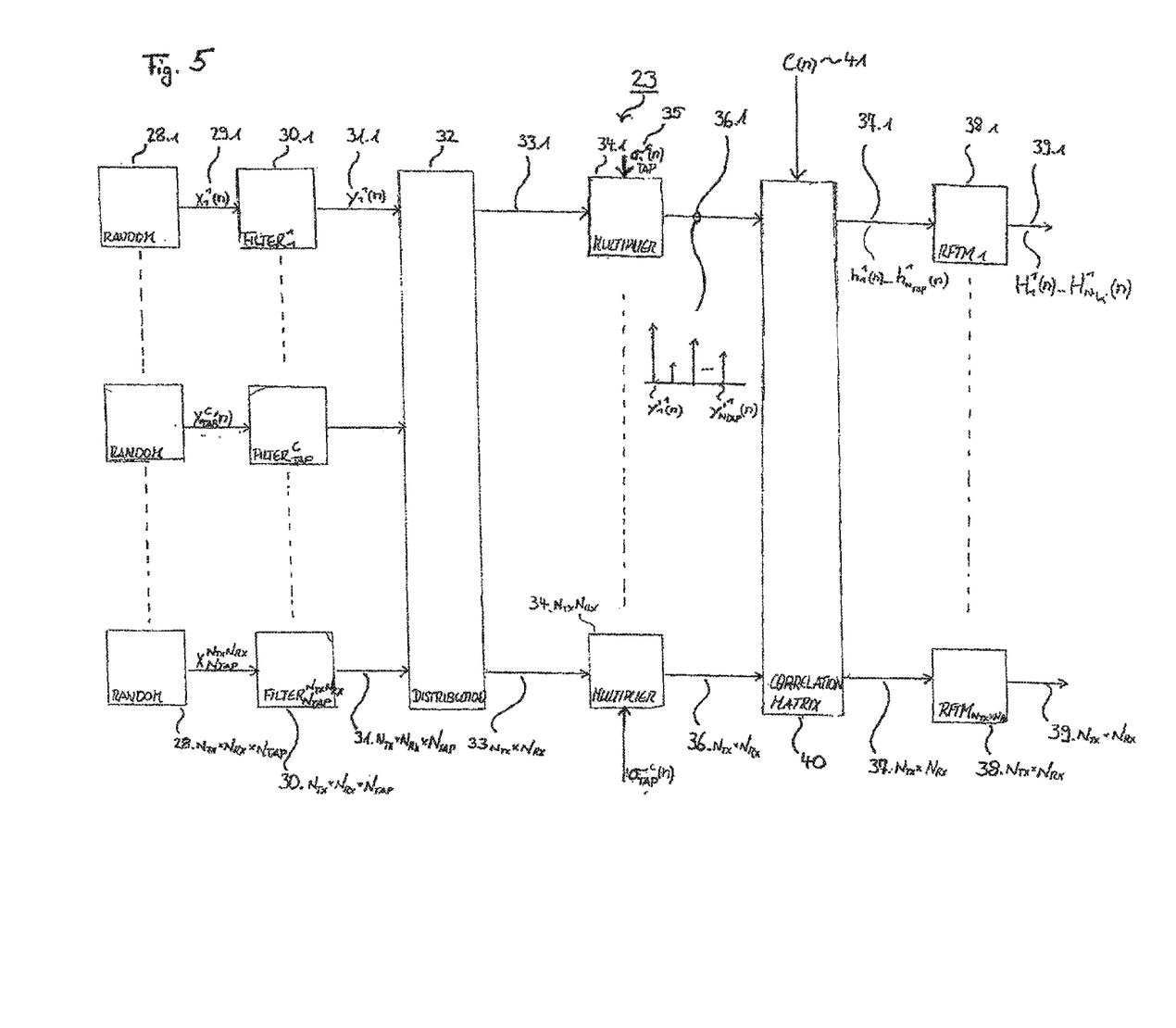
FIG. 5 shows a block diagram of a channel response generating means according to an embodiment of the invention.

FIG. 5 shows a block diagram of a channel response generator 23 according to an embodiment of the invention. In FIG. 5 the random number generator 28.1 and the filter 30.1 constitute together an example of a sample generating means in the attached claims. The distribution means in the attached claims corresponds to distribution unit 32 in FIG. 5. The correlation matrix unit 40 in FIG. 5 is an example of the multiplying means in the attached claims. The transforming means in the attached claims correspond to the Reduced Fourier Transform Matrices units 38 (RFTM-units) in the embodiment depicted in FIG. 5.

When discussing the channel response generator 23, the parameter c denotes a transmission channel index and the parameter "tap" denotes a filter tap index. The named parameters are included in the following parameter ranges $$1 \leq c \leq N_{TX} \times N_{RX} \quad (7)$$

$$1 \leq tap \leq N_{TAP} \quad (8)$$

with $N_{TX}$ referring to the number of transmit means or transmit antennas, $N_{RX}$ referring to the number of receive means or receive antennas and $N_{TAP}$ referring to the number of filter taps of the digital filter representation of the transmission channel model.

In the description of the embodiment only the term "random number" is used. It is self explanatory that not only true random numbers but also "pseudo-random numbers" are to be understood thereby.

The channel response generating means 23 includes $N_{TX} \times N_{RX} \times N_{TAP}$ random number generators 28.1 . . . 28.$N_{TX} \times N_{RX} \times N_{TAP}$. Each random number generator is configured to realize a random process and to output independent and identically distributed complex samples 29 $x_{TAP}^c(n)$ at each instant of time n. The time index n refers to a time interval $\Delta T_{update}$, where $\Delta T_{update}$ is a time interval, for which the channel response parameters $H_k^c(n)$ can be regarded as constant. Advantageously the time $\Delta T_{update}$ is chosen taking account of the coherence time of a fading model selected for the fading simulation to be implemented. The real part as well as the imaginary part of each sample $x_{tap}^c(n)$ 29 is respectively independent and identically distributed. Further the complex samples of different random number generators 28.1, . . . 28.$N_{TX} \times N_{RX} \times N_{TAP}$ are also independent from each other. The complex samples 29 of each random number generators 28.1, . . . 28.$N_{TX} \times N_{RX} \times N_{TAP}$ each are provided to one corresponding filter 30.1 . . . 30.$N_{TX} \times N_{RX} \times N_{TAP}$ corresponding to the random number generator 28.1, . . . , 28.$N_{TX} \times N_{RX} \times N_{TAP}$. The respective outputs 31.1 . . . 31.$N_{TX} \times N_{RX} \times N_{TAP}$ of the filter 30.1, . . . , 30.$N_{TX} \times N_{RX} \times N_{TAP}$ is given by the equation $$y_{tap}^c(n) = \sum_{r=0}^{L-1} f_{tap}^c(r) x_{tap}^c(n-r) \quad (9)$$

wherein $y_{tap}^c(n)$ is the filter output, L denotes the length of the filter impulse response $f_{tap}^c(n)$. The filter 30.1, . . . 30.$N_{TX} \times N_{RX} \times N_{TAP}$ define the autocorrelation function (abbreviated ACF) and the power spectral density (PSD) of the random process $y_{tap}^c(n)$ at the filter output.

The filtered complex samples 31.1, . . . 31.$N_{TX} \times N_{RX} \times N_{TAP}$ output by the filters 30.1, . . . 30.$N_{TX} \times N_{RX} \times N_{TAP}$ are supplied to the distribution unit 32. The distribution unit 32 is configured to set up $N_{TX} \times N_{RX}$ impulse responses, one for each transmission channel. The output of the distribution unit 32 is one sample sequence at each instant of time for each transmission channel 6, 7, 8 The sample sequence for each transmission channel 6, 7, 8 is generated by rearranging the filter outputs $y_{tap}^c(n)$ so that each of these sequences 33.1, ..., 33.$N_{TX}\lambda N_{RX}$ output by the distribution unit 32 includes $N_{TAP}$ samples. The processing in the distribution unit 32 is a mere distribution of input sample sequence streams to output sample sequence streams, each output sample sequence having $N_{TAP}$ samples. Each of the $N_{TAP}$ filter outputs $y_{tap}{}^c(n)$ within one data sequence is fed to a multiplier unit 34.1, ... 34.$N_{TX} \times N_{RX}$ to be multiplied with $\sigma_{tap}{}^c(n)$ $$y'_{tap}{}^c(n) = y_{tap}{}^c(n)\sigma_{tap}{}^c(n) \tag{10}$$

with $$1 \leq tap \leq N_{TAP} \tag{11}$$

wherein tap denotes a tap index running from 1 to $N_{TAP}$, $y'_{tap}{}^c(n)$ is the output signal of the multipliers 34.1, ..., 34.$N_{TX} \times N_{RX}$ and $y_{tap}{}^c(n)$ refers to the respective elements of the input data sequences to the multipliers 34.1, ... 34.$N_{TX} \times N_{RX}$. For each sequence there is provided one multiplier 34.1, ... 34.$N_{TX} \times N_{RX}$ for multiplying $y_{tap}{}^c(n)$ with a value (standard deviation) $\sigma_{tap}{}^c(n)$ for scaling.

The multipliers 37.1, ... 37.$N_{TX} \times N_{RX}$ can be implemented as discrete elements. In an alternate embodiment the function performed by the multipliers 34.1, ... 34.$N_{TX} \times N_{RX}$ can be integrated with the filters 30.1, ... 30.$N_{TX} \times N_{RX} \times N_{TAP}$ by respectively scaling the filter transfer functions of the filters 30.1, ... 30.$N_{TX} \times N_{RX} \times N_{TAP}$.

The transmission channel sample sequences $y'_{tap}{}^c(n)$ 33.1, ..., 33.$N_{TX} \times N_{RX}$ are Fed to the Correlation Matrix Unit 40 to be multiplied with a correlation matrix $C(n)$ in order to generate a set of channel impulse responses 34.1, ..., 34.$N_{TX} \times N_{RX}$ $$h^c_{tap}(n) = \sum_{i=1}^{N_{TX} \times N_{RX}} y'^i_{tap}(n) C_{1c}(n) \tag{12}$$

In equation (12), the $y'_{tap}{}^i(n)$ are the elements of the transmission channel sample sequences 36.1, ... 36.$N_{TX} \times N_{RX}$ as output signals of the multiplier units 34.1, ... 34.$N_{TX} \times N_{RX}$, $h_{tap}{}^c(n)$ are the channel impulse responses 37.1, ... 37.$N_{TX} \times N_{RX}$ at filter tap tap and instant of time n for transmission channel c, $N_{TX}$ is the number of receive means, $N_{TX}$ is the number of transmit means and $C_{ic}(n)$ are the respective correlation matrix entries $C_{ij}(n)$ for an instant of time n, i indexing the rows of the correlation matrix C and j indexing the columns of the correlation matrix with $$1 \leq i,j \leq N_{TX} \times N_{RX} \tag{13}$$

The entries $C_{ij}(n)$ may be derived from the standard to be implemented or based on a developer's knowledge about a system of interest. An example will be given later. The correlation matrix $C(n)$ is configured to take the interactions between the transmission channels c into account. The correlation matrix $C(n)$ 41 may be provided externally to the correlation matrix unit 40 from a storage.

The elements $C_{ij}(n)$ of the correlation matrix may be defined in a communication standard applicable for a communication to the device under test. As an example the correlation matrix $R_{LTE}$ defined in the series of technical specifications for the 4th generation wireless communication system LTE is cited. In the present embodiment the elements $C_{ij}(n)$ may vary with time n, whereas in the cited LTE specifications the elements $C_{ij}(n)$ are constant in time. The elements $C_{ij}(n)$ may also be determined experimentally and/or by modeling a wireless channel to be simulated by the channel simulation. The present invention is not limited to either example given before.

The channel impulse responses $h_{tap}{}^c(n)$ 37.1, ... 37.$N_{TX} \times N_{RX}$ are then provided to transforming means 38.1, ... 38.$N_{TX} \times N_{RX}$. The transforming means is also referred to as a reduced Fourier transform matrix units 38.1, ... 38.$N_{TX} \times N_{RX}$ (RFTM units 38.1, ... 38.$N_{TX} \times N_{RX}$) in this embodiment. The RFTM units calculate channel response parameters 39.1, ... 39.$N_{TX} \times N_{RX}$ by transforming the channel impulse responses $h_{tap}{}^c(n)$ 37.1, ... 37.$N_{TX} \times N_{RX}$ into the frequency domain according to the equation $$H^c_k(n) = \sum_{tap=1}^{N_{TAP}} h^c_{tap}(n)\exp(-j2\pi \times k \times \Delta f \times \tau(\text{tap}, n)) \tag{14}$$

wherein in equation (14) $H_k{}^c(n)$ denotes the frequency domain channel response parameter for a subcarrier k, a transmission channel c and an instant of time n, $N_{TAP}$ denotes the number of taps of the transmission channel filter model, $\Delta f$ is the subcarrier spacing, c is the transmission channel index, j is $\sqrt{-1}$. Collecting the channel response parameters 39.1, ..., 39.$N_{TX} \times N_{RX}$ $H_k{}^c(n)$ at the subcarriers k with $$1 \leq k \leq N_k \tag{15}$$

the above described calculation may be noted in matrix notification as multiplication $$\underline{H}^c(n) = W(n)\underline{h}^c(n) \tag{16}$$

with a $N_k \times N_{TAP}$ matrix $W(n)$ whose entries in the i-th row and the j-th column $W_{ij}(n)$ are given as $$W_{ij}(n) = \exp(-j2\pi \times i \times \Delta f \times \tau(j, n)) \tag{17}$$

wherein $$1 \leq i \leq N_k \tag{18}$$

and $$1 \leq j \leq N_{TAP}$$

and $$\underline{H}^c(n) = \begin{bmatrix} H^c_1(n) \\ \vdots \\ H^c_{N_k}(n) \end{bmatrix} \tag{19}$$

$$\underline{h}^c(n) = \begin{bmatrix} h^c_1(n) \\ \vdots \\ h^c_{N_{TAP}}(n) \end{bmatrix} \tag{20}$$

The inventive matrix $W(n)$ is given a new term "reduced Fourier transform matrix" (RFTM) and provides an efficient method to determine the channel response parameters 39.1, ... 39.$N_{TX} \times N_{RX}$ by a matrix multiplication. But the described method is by no means intended to be limiting. It is also possible to calculate the channel response parameters 39.1, ... 39.$N_{TX} \times N_{RX}$ based on the symmetry properties of the $N_k \times N_{TAP}$ matrix $W(n)$ in equation (16) and use more efficient implementations of equation (16). Furthermore equation (14) uses the subcarrier frequencies $k\Delta f$. Other frequencies, even when not equally distanced, may of course also be used.

An alternate embodiment of the present invention does not calculate the channel response parameters $H_k{}^c(n)$ for all k subcarrier frequencies, but only calculates $H_k{}^c(n)$ for a subset of the subcarrier frequencies k. The other required channel response parameters $H_k^c(n)$ are then determined by means of interpolation. An interpolation unit not shown in the figures may in this embodiment be arranged in each signal path in FIG. 5, receiving as an input a reduced number $N_k$ of calculated channel response parameters from part of the transforming means 38.1, ..., 38.$N_{TX} \times N_{RX}$ and outputting as channel response parameters a number of $N_{k'}$ of interpolated channel response parameters which are computed in the interpolation unit. Hence $H_k^c(n)$ 11 with $1 \leq k \leq N_k$ is transformed to $H'_{k'}^c(n)$ with $1 < k' < N_{k'}$ with $N_k < N_{k'}$. Hence a further reduction in computational effort can be achieved by further reducing the inventive RFTM-matrix.

The channel response generating means 23 of the fading simulating unit 15.2 is depicted in FIG. 5 and described in the corresponding sections of the description as being provided externally with the correlation matrix C(n) and the values $\sigma_{tap}^c(n)$ only. Other subassemblies of the channel response generating means 23 than the correlation matrix unit 40 and the multipliers 34.1, ... 34.$N_{TX} \times N_{RX}$ are also adapted to be configured externally.

The calculation means 21 in FIG. 4 is provided with the channel response parameters $H_k^c(n)$ 39.1, ... 39.$N_{TX} \times N_{RX}$ calculated in the channel response generating means 23 as discussed before. A dynamic filter matrix (DFM) is defined as $$DFM(k, n') = \begin{bmatrix} H_k^1(n') & H_k^{N_{TX}+1}(n') & \cdots & H_k^{(N_{RX}-1)N_{TX}+1}(n') \\ \vdots & \ddots & & \vdots \\ H_k^{N_{TX}}(n') & H_k^{2N_{TX}}(n') & \cdots & H_k^{N_{RX}N_{TX}}(n') \end{bmatrix}_{N_{RTX} \times N_{RX}} \quad (21)$$

for a subcarrier k at an instant of time n', with frequency domain channel responses $H_k^c(n')$ for a subcarrier k and a channel c at an instant of time n'. As already mentioned above the time index n' refers to a time $\Delta T_{symb}$ which corresponds to the symbol length. Defining $H_k^c(t)$ with respect to a continuous time t as a segment-wise constant function according to $$H_k^c(t) = H_k^c(n) \text{ for}$$

$$n\Delta T_{update} \leq t < (n-1)\Delta T_{update}$$

then $H_k^c(n')$ can be obtained from $H_k^c(t)$ by setting $t = n'\Delta T_{symb}$.

The calculation means 21 receives a vector $$\underline{a}(k, n') = \begin{bmatrix} a_1(k, n') \\ \vdots \\ a_{N_{TX}}(k, n') \end{bmatrix}_{N_{TX} \times 1} \quad (22)$$

comprising a number of $N_{TX}$ constellation symbols for the $N_{TX}$ transmit means at an instant of time n' and a subcarrier k. The vector $\underline{a}(k,n')$ is multiplied with the dynamic filter matrix DFM(k,n') and outputted is a vector $$\underline{a}'(k, n') = \begin{bmatrix} a'_1(k, n') \\ \vdots \\ a'_{N_{RX}}(k, n') \end{bmatrix}_{N_{RX} \times 1} \quad (23)$$

wherein the vector $\underline{a}'(k,n')$ includes $N_{RX}$ faded constellation symbols. Hence the input-output relation of the calculation means 21 can be expressed in matrix notation $$\underline{a}'(k,n') = DFM(k,n')\underline{a}(k,n') \quad (24)$$

with a dynamic filter matrix DFM(k,n') being time variant.

For $N_{TX}=1$ and $N_{RX}=1$, a single input single output (SISO-) transmission system is regarded. The inventive signal generating device 15 nevertheless is also applicable in this case.

Figure 6:
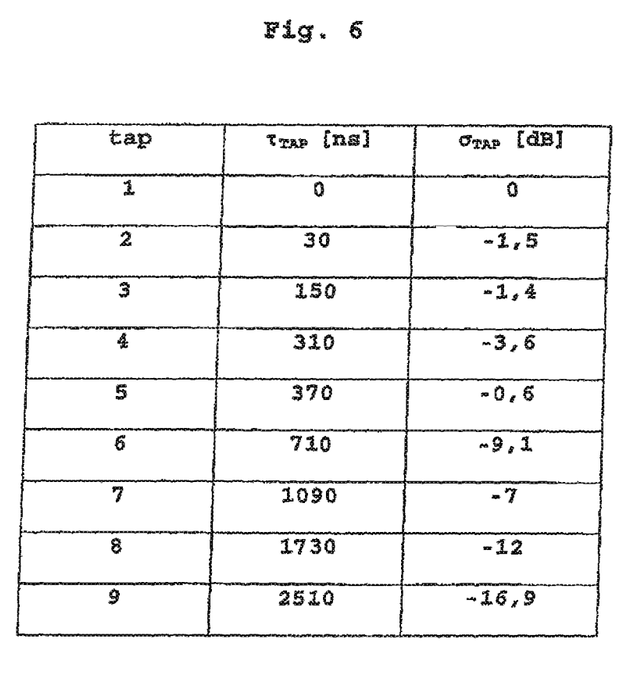
FIG. 6 shows an 8×2 MIMO fading profile based on a LTE scenario.
Figure 7:
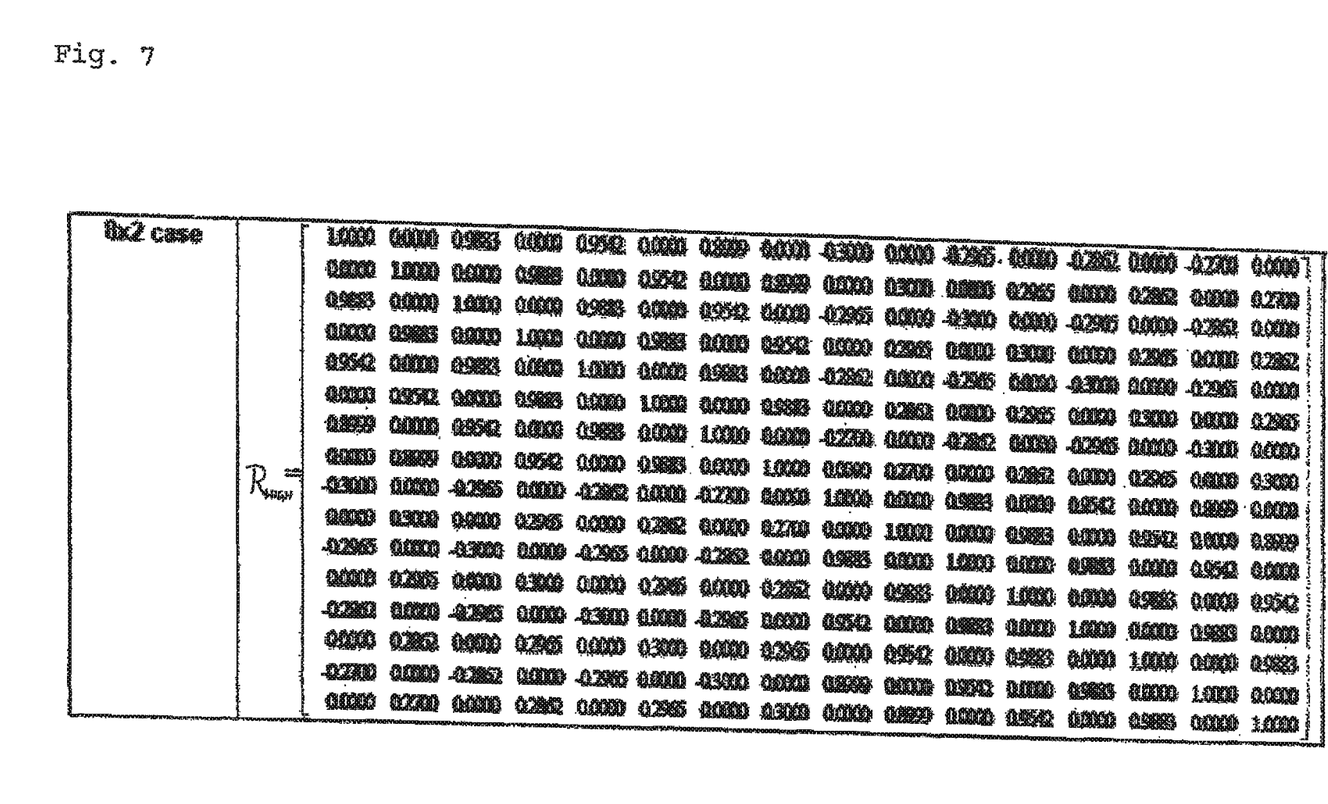
FIG. 7 shows a MIMO correlation matrix $R_{HIGH}$ for high spatial correlation for an LTE scenario.

FIG. 6 and FIG. 7 are discussed with reference to an application example of an embodiment of the present invention. The example is chosen as an illustration for employing the signal generator 15 and the disclosed invention is not limited to the described embodiment.

In the LTE conformance test specification 3GPP TS 36521-1 10.4.0 a MIMO scenario with a number of transmit antennas of $N_{TX}=8$ and a number of receive antennas of $NR_X=2$ is described. The number of subcarriers is set to $N_k=600$ and the number of filter taps to $N_{TAP}=9$ in the shown scenario. FIG. 6 gives the fading profile from the cited test specification. The first column of the table in FIG. 6 gives the tap index tap, the second column provides the respective delay $T_{tap}$ in nanosecond (ns), and the third column provides the respective value $\sigma_{TAP}$ for the relative power in dB. The chosen model corresponds to the extended vehicular A model (abbreviated as EVA) in the cited specification defining a multipath fading model.

FIG. 7 provides an example for a MIMO correlation matrix $R_{high}$ for a MIMO scenario with high spatial correlation taken from LTE conformance test specification 3GPP TS 36521-1 10.4.0. The MIMO correlation matrix 41 as to be used into the correlation matrix unit 40 of the channel response generating means 23 in FIG. 5 is determined by Cholesky decomposition of the correlation matrix $R_{high}$ shown in FIG. 7.

Each filter 30.1, ... 30.$N_{TX} \times N_{RX} \times N_{TAP}$ would have the same filter impulse response $$f_i^c(n) \rightarrow f(n) \quad (25)$$

The impulse responses can for example be obtained from a square root $\sqrt{S(f)}$ of a PSD S(f) being defined by $$S_t(f) = \begin{cases} \dfrac{1}{\pi f_d \sqrt{1 - \left(\dfrac{f}{d}\right)^2}}, & |f| \leq f_d \\ 0, & |f| \geq f_d \end{cases}$$

wherein $f_d$ denotes the Doppler frequency, by sampling $\sqrt{S(f)}$ at $N_{DFT}$ equidistant points and computing an inverse discrete Fourier transformation (IDFT). The thus obtained impulse responses can be shortened to a length $N_{IR} < NIDFT$ by using a window function. One example of a window function to be used to this end can be a Kaiser-window.

The terms $\sigma_{tap}^c(n)$ 35 are in the given example time-invariant:

$$\sigma_{tap}^c(n) \rightarrow \sigma_{tap} \quad (26)$$

and can be drawn from the table in FIG. 6. The correlation matrix C(n) 41 would also be time invariant:

$$C(n) \rightarrow C \quad (27)$$

From $R_{high}$ provided in the table of FIG. 7 and using the equation (28)

$$R_{high} = C^H C \quad (28)$$

the correlation matrix C may be determined by Choleksy decomposition of the MIMO correlation matrix $R_{high}$ for high spatial correlation. In equation (28) $C^H$ is the Hermitian matrix to C. The subcarrier frequency spacing Δf is set to 15 kHz in the present example. With the values given for Δf, and $\tau_{TAP}$ given by FIG. 6 the reduced Fourier transform Matrix RFTM can be calculated in the transforming means 38.1, . . . , 38.$N_{TX} \times N_{RX}$. The 50% coherence time of the fading model used in this example is given by $$T_c = \frac{9}{16\pi f_d} = 35.8 \text{ ms} \qquad (29)$$

with a Doppler frequency $f_d$=5 Hz and accordingly an update time $\Delta T_{update}$ could be suitably chosen to be $$\Delta T_{update} = 20 \text{ ms}. \qquad (30)$$

A further advantageous embodiment reduces the computational complexity by not calculating the RFTM matrix for every subcarrier, but, for example, for every second subcarrier as subset of subcarriers. If the subcarrier spacing is much smaller than the coherence bandwidth of the fading profile employed in the channel simulation, the interpolating unit after the reduced Fourier transform matrix units 38.1, . . . 38.$N_{TX} \times N_{RX}$ can be implemented in a simple manner. In this case the interpolating unit could be implemented by a sample-and-hold module. The interpolation executed by a sample-and-hold module corresponds to a $0^{th}$-order interpolation.

The computational advantages presented by the inventive signal generating unit 15 can be estimated by examining the transform parameter generating means 23 and the calculation means 21 characterising the signal generating device 15 with integrated fading simulation in comparison with the signal generator 11 of the state of the art with the external fading simulator 1.

The processing steps of the channel response generator unit 23 to the RFTM units 38.1, . . . 38.$N_{TX} \times N_{RX}$ are required in the state of the art fading simulation in the fading simulator 1 also. Hence for comparing the inventive approach for signal generating integrating fading simulation with the state of the art, the processing executed in the RFTM units 38.1, . . . , 38.$N_{TX} \times N_{RX}$, further the processing in the calculation means 21 and the different number of modulation units required in the signal generating device 15 has to be considered to estimate the improvement. The number of modulators for example is changed from $N_{TX}$ to $N_{RX}$ in the signal generating device 15. In most cases this is a significant reduction.

In the following section a short estimation for illustrative purposes is calculated.

Within one $\Delta T_{update}$ the RFTM units 38.1, . . . , 38.$N_{TX} \times N_{RX}$ require $$N_{TX} \times N_{RX} \times N_K \times N_{TAP} = 86.400 \text{ multiplications}. \qquad (31)$$

The calculation means 21 requires $$20 \times 14 \times N_{TX} \times N_{RX} \times N_K = 2.688.000 \text{ complex multiplications}. \qquad (32)$$

The multiplicator value of 20 results from a subframe length of 1 ms as applicable for example in the LTE specifications Each subframe contains 14 OFDM symbols. Two modulators are required for an 8×2 MIMO system. The modulators may be implemented as inverse fast Fourier transform (IFFT) in case of LTE. This accounts for two 1024 point IFFTs for a 10 MHz LTE cell required per OFDM symbol. Hence within one $\Delta T_{update}$ the IFFTs account for $$20 \times 14 \times 2 \times 1.024 \times \log_2(1.024) = 5.734.400 \text{ complex multiplications}. \qquad (33)$$

In total, a number of $$86.400 + 2.688.000 + 5.734.400 = 8.508.800 \text{ complex multiplications} \qquad (34)$$

is estimated for the inventive approach. Contrary thereto the prior art approach requires 8 IFFTs for a 8×2 MIMO system and at least 8 1.024 point IFFTs per OFDM symbol. Hence within one $\Delta T_{update}$ this accounts for $$20 \times 14 \times 8 \times 1.024 \times \log_2(1.024) = 22.937.600 \text{ complex multiplications} \qquad (35)$$

in case of the IFFT in the approach according to the state of the art with an external fading simulation. The time domain fading simulator has to run at least at the signal sampling rate $f_s$. In case of a LTE 10 MHz cell as an example $f_s$=15.36 MHz is given. For each sample $N_{TX} \times N_{RX}$ filter outputs, one for each simulated transmission channel, require $N_{TAP}$ complex multiplications each. Hence the time domain fading simulator 1 according to prior art within one $\Delta T_{update}$ requires $$\Delta T_{update} \times f_s \times N_{TX} \times N_{RX} \times N_{TAP} = 44.236.800 \text{ complex multiplications}. \qquad (36)$$

In total the comparison figure for the complexity of the prior art approach is calculated to $$22.937.600 + 44.236.800 = 67.174.400 \text{ complex multiplications}. \qquad (37)$$

Comparing the results of equation (34) with equation (37), only about 12.7% of the complex multiplications are required for the new approach comparing the decisive processing steps with the state of the art approach. This results from integrating the fading simulation into the signal generating and generating the number of $N_{Rx}$ data streams exactly as needed for test outputs to the DUT 10 and not the $N_{TX}$ data streams as required for the external fading simulation with fading simulation processing in the time domain. This results in a significantly reduced data rate on an internal bus of the signal generating device 15 compared to a bus in the in the signal generator 11 state of the art fading approach. Complexity and costs of the signal generating device are accordingly significantly reduced.

Figure 8:
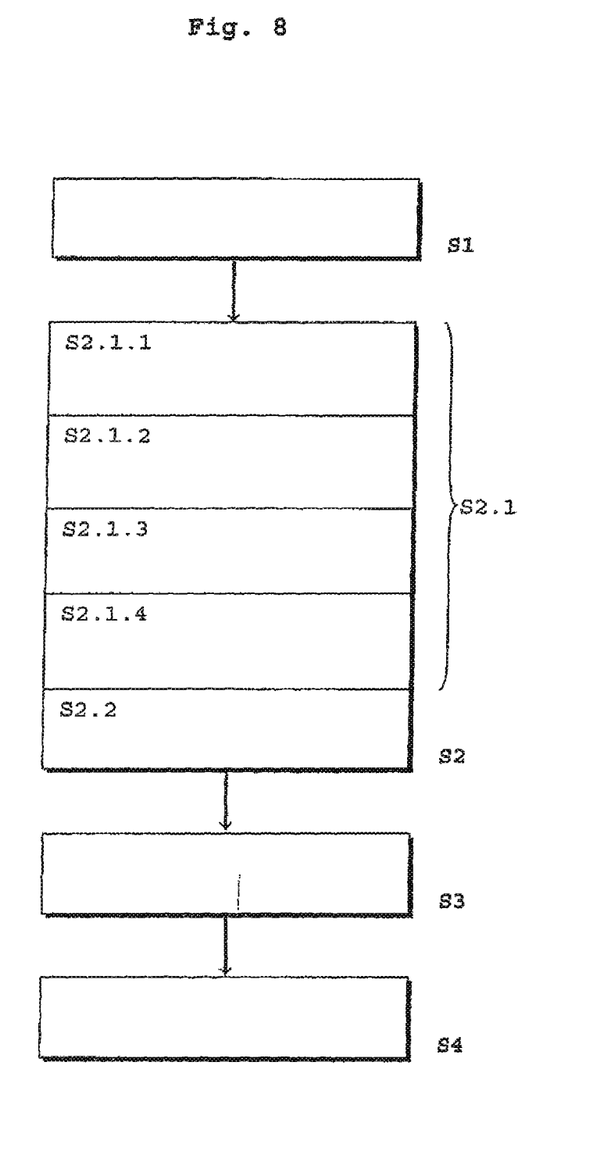
FIG. 8 depicts a flowchart describing a signal generating method according to an embodiment of the invention.

FIG. 8 gives a flowchart for a signal generating method with included fading simulation according to an embodiment of the invention.

In a first step S1, a first number of symbols according to a number of transmitting means for a simulated transmission to a device under test is generated. The first number of symbols corresponds, for example, to a number of $N_{TX}$ transmit antennas in a MIMO system.

In a second step S2 a set of filter parameters is generated from a predetermined fading profile. The set of filter parameters corresponds to a dynamic filter matrix DFM with matrix elements constituting frequency domain channel responses $H_k^c(n')$.

In step S2 further, a second number of faded symbols, the second number corresponding to a number of receiving means $N_{RX}$ of the device under test and hence to the output test signals 16.1, . . . 16.$N_{RX}$ based on a set of filter parameters according to the equation (24) is calculated.

In step S2, a transform parameter generating step (S2.1) of generating a set of channel response parameters from a set of channel impulse responses characterising the transmission channels is included. The set of channel response parameters is used to generate a set of filter parameters in a following step of generating filter parameters (S2.2) from the set of channel response parameters.

The transform parameter generating step S2.1 can further include four substeps S2.1.1 to S2.1.4.

In a plural sample generating step S2.1.1 filtered complex samples are generated by filtering independent and identically distributed complex samples.

In a distribution step S2.1.2 the filtered complex samples are rearranged in order to generate a sample sequence sequence for each transmission channel 6, 7, 8. More specifically the distribution step S2.1.2 can include generating sample sequence data streams for each transmission channel by arranging a third number of filtered complex samples sequentially, wherein the third number of complex samples corresponds to a number of taps for each transmission channel Then the one or more transmission channel sample sequence streams are multiplied with a correlation matrix 41 to generate the set of channel impulse responses in a multiplying step S2.1.3. The sample generating step can include filtering complex samples to define autocorrelation and Doppler characteristics of the filtered complex samples.

A transforming step S2.1.4 includes calculating the set of channel response parameters by transforming the set of channel impulse responses into the frequency domain. The transforming step S2.1.4 can include determining additional channel response parameters by calculating via interpolation.

After a second number of faded symbols according to the equation (24) is calculated, in step S2, in a following step S3 the calculated second number of faded symbols are provided to the modulating units 26.1, . . . 26.$N_{RX}$. In step S4, modulated test signals for transmission to the device under test 10 are generated from the faded second number of faded symbols.

The invention is not limited to the examples and especially not to an OFDM communication standard. Other and different communication standards for multicarrier systems can be used. The characteristic features of the exemplary embodiments can be used in any advantageous combination of the features claimed in the claims and/or described in the description and/or drawn in the drawings.

The invention claimed is:

1. A signal generating device for generating testing signals for testing a MIMO device under test, the signal generating device comprising:
 a fading simulation unit;
 a signal generating unit; and
 a modulating unit, wherein:
  the signal generating unit is configured to generate a first number of symbols according to a number of transmitting means for a simulated transmission to a device under test,
  the fading simulation unit is configured to calculate from the first number of symbols a second number of faded symbols, based on a set of channel response parameters, and to provide the calculated second number of faded symbols to the modulating unit, and
  the modulating unit is configured to generate and output to the device under test modulated signals from the second number of the faded symbols, wherein a number of modulated signals to be output corresponds to a number of receiving means of the device under test, and wherein the fading simulation unit comprises:
 a transform parameter generating means configured to generate the set of channel response parameters from a set of channel impulse responses characterising transmission channels;
 a calculation means configured to calculate the second number of faded symbols from the first number of symbols using the channel response parameters, and
the transform parameter generating means comprises:
 sample generating means configured to generate filtered complex samples by filtering independent and identically distributed complex samples;
 a distribution means configured to rearrange the filtered complex samples to generate sample sequence streams for each transmission channel;
 a multiplying means configured to multiply the one or more transmission channel sample sequence streams with a correlation matrix to generate the set of channel impulse responses; and
 a transforming means configured to calculate the set of channel response parameters by transforming the set of channel impulse responses into the frequency domain.

2. The signal generating device according to claim 1, wherein a transmission channel is defined between each of the transmitting means of a signal source and each of the receiving means of a real system to be simulated.

3. The signal generating device according to claim 2, wherein the transforming means is configured to transform the set of channel impulse responses into the frequency domain based on a predetermined frequency spacing.

4. The signal generating device according to claim 3, wherein the transforming means is configured to generate a reduced Fourier transform matrix, the reduced Fourier transform matrix configured for transforming the set of channel impulse responses into the frequency domain by multiplying the set of channel impulse responses with the reduced Fourier transform matrix.

5. The signal generating device according to claim 4, wherein the transforming means is configured to determine additional channel response parameters by interpolation.

6. The signal generating device according to claim 5, wherein the correlation matrix comprises parameters describing the characteristics of each transmission channel and interdependencies between the transmission channels.

7. The signal generating device according to claim 6, wherein each sample generating means comprises filter means being configured to filter complex samples to define autocorrelation and Doppler characteristics of the filtered complex samples.

8. The signal generating device according to any to claim 7, wherein the distribution means is configured to generate sample sequence data streams for each transmission channel by arranging a third number of filtered complex samples sequentially, wherein the third number of complex samples corresponds to a number of taps for each transmission channel.

9. A signal generating method for generating testing signals for testing a MIMO device under test, the method comprising steps of:
 generating a first number of symbols according to transmitting means for a simulated transmission to a device under test;
 generating the set of channel response parameters from a set of channel impulse responses characterising transmission channels;

calculating from the first number of symbols a second number of faded symbols based on the set of channel response parameters with a time-variant matrix comprising a set of channel response parameters, wherein a number of symbols to be output corresponds to a number of receiving means of the device under test, based on a set of filter parameters;

providing the calculated second number of faded symbols to the modulating unit; and generating modulated signals from the second number of faded symbols and outputting the modulated signals to the device under test, wherein generating the channel transform parameter comprises:

a sample generating step of generating filtered complex samples by filtering independent and identically distributed complex samples;

a distribution step of rearranging the filtered complex samples to generate a sample sequence stream for each transmission channel;

a multiplying step of multiplying the one or more transmission channel sample sequence streams with a correlation matrix to generate the set of channel impulse responses; and a transforming step of calculating the set of channel response parameters by transforming the set of channel impulse responses into the frequency domain.

10. The signal generating method for generating a faded modulated signal according to claim 9, wherein in the transforming step additional channel response parameters are determined by interpolation.

11. The signal generating method for generating a faded modulated signal according to claim 10, wherein the sample generating step comprises filtering complex samples to define autocorrelation and Doppler characteristics of the filtered complex samples.

12. The signal generating method for generating a faded modulated signal according to claim 11, wherein in the distribution step, sample sequence data streams for each transmission channel are generated by arranging a third number of filtered complex samples sequentially, wherein the third number of complex samples corresponds to a number of taps for each transmission channel.

13. A non-transitory computer program-product storing thereon a computer readable program that when running on a computer or digital signal processor causes the computer or digital signal processor to perform the method steps according to claim 9, when the program is executed on the computer or the digital signal processor.

* * * * *